United States Patent [19]

Oxley et al.

[11] Patent Number: 5,439,252
[45] Date of Patent: Aug. 8, 1995

[54] DUAL PIVOT STEERING COLUMN

[75] Inventors: Gerald K. Oxley; Chester D. Renick; Frederick D. Venable, all of Lafayette, Ind.

[73] Assignee: TRW Inc., Lyndhurst, Ohio

[21] Appl. No.: 52,195

[22] Filed: Apr. 22, 1993

[51] Int. Cl.⁶ .............................................. B62D 1/18
[52] U.S. Cl. ........................................ 280/775; 74/493
[58] Field of Search ................... 280/775; 74/493, 492

[56] References Cited

U.S. PATENT DOCUMENTS

| | | | |
|---|---|---|---|
| 3,548,675 | 12/1970 | Crimes et al. | 74/493 |
| 3,628,396 | 12/1971 | Grokowski | 74/493 |
| 4,774,851 | 10/1988 | Iwanami et al. | 74/493 |
| 4,900,059 | 2/1990 | Kinoshita et al. | 28/775 |
| 4,915,412 | 4/1990 | Yuzuriha et al. | 280/775 |
| 5,035,446 | 7/1991 | Arvidsson | 74/493 |
| 5,105,677 | 4/1992 | Hoblingre et al. | 20/775 |
| 5,178,411 | 1/1993 | Fevre et al. | 280/775 |
| 5,265,492 | 11/1993 | Snell | 280/775 |

FOREIGN PATENT DOCUMENTS

| | | | |
|---|---|---|---|
| 0125333 | 11/1984 | European Pat. Off. | 74/493 |
| 0258471 | 10/1990 | Japan | 250/775 |

*Primary Examiner*—Margaret A. Focarino
*Assistant Examiner*—Christopher Ellis
*Attorney, Agent, or Firm*—Tarolli, Sundheim & Covell

[57] ABSTRACT

A steering column for the steering system of an automotive vehicle has a first steering column member axially movable relative to a second steering column member. The second steering column member is pivotable relative to a vehicle frame. An input shaft connectable with a steering wheel is pivotable relative to the first steering column member. A first tilt locking means locks the second steering column member in a pivot position relative to the vehicle frame. A second tilt locking means locks the input shaft in a pivot position relative to the first steering column member. A telescope locking means locks the first steering column member in an axial position relative to the second steering column member. A locking member has a first position in which the first and second tilt locking means and the telescope locking means are locked. The locking member has a second position in which the first tilt locking means and the telescope locking means are locked and the second tilt locking means is unlocked. The locking member also has a third position in which the first tilt locking means and the telescope locking means are unlocked and the second tilt locking means is locked.

12 Claims, 9 Drawing Sheets

DUAL PIVOT STEERING COLUMN

BACKGROUND OF THE INVENTION

The present invention relates to an adjustable, rotatable drive shaft for a steering system of an automotive vehicle. Specifically, the invention pertains to a drive shaft used as a tilt and telescope steering column, and more specifically to a tilt-telescope steering column in which the overall length of the drive shaft is adjustable by providing a first steering column member that can be moved axially relative to a second steering column member and the relative angular positions of the first and second steering column members can be adjusted by providing a second steering column member that is pivotable about a generally horizontal axis relative to a vehicle frame and an input shaft that is pivotable about a second generally horizontal axis and can be pivoted relative to the first steering column member.

A known steering column is disclosed in U.S. Pat. No. 4,240,305. U.S. Pat. No. 4,240,305 discloses a steering column with a first steering column member that is selectively axially adjustable relative to a second steering column member. An input shaft is selectively pivotally adjustable relative to the first steering column member. A clamp is loosened to adjust the position of the first steering column member relative to the second steering column member and the input shaft relative to the first steering column member. The clamp is tightened to hold the steering wheel in the adjusted position. Therefore, the steering wheel can only be adjusted by pivoting the input shaft relative to the first steering column member or by moving the first steering column member axially relative to the second steering column member.

SUMMARY OF THE INVENTION

The invention described and claimed in this application relates to a steering column for an automotive vehicle which improves the comfort, convenience and safety of a vehicle operator. The steering column of the present invention includes first and second coaxial steering column members. The first steering column member telescopes axially relative to the second steering column member. A telescope locking means locks the first steering column member in an axial position relative to the second steering column member. The second steering column member is pivotable relative to the vehicle frame. A first tilt locking means locks the second steering column member in a pivot position relative to the vehicle frame. An input shaft connectable with a steering wheel is supported on the first steering column member for pivotal movement relative to the first steering column member. A second tilt locking means locks the input shaft in a pivot position relative to the first steering column member.

A locking member unlocks the first and second tilt locking means and the telescope locking means. The locking member has a first position in which the first and second tilt locking means and the telescope locking means are locked. The locking member is biased into its first position so that the first and second tilt locking means and the telescope locking means are normally locked. The member has a second position in which the first tilt locking means and the telescope locking means are locked and the second tilt locking means is unlocked. The locking member has a third position in which the first tilt locking means and the telescope locking means are unlocked and the second tilt locking means is locked. Thus, the first steering column member can be moved axially relative to the second steering column member and the second steering column member can be pivoted relative to the vehicle frame while the input shaft remains in a fixed pivot position relative to the first steering column member. Also, the input shaft can be pivoted relative to the first steering column member while the first steering column member remains in a fixed axial position relative to the second steering column member and a second steering column member remains in a fixed pivot position relative to the vehicle frame.

The steering column includes a pivot carrier connected to the first steering column member. An arm extends between the pivot carrier and the vehicle frame to control the pivot position of the second steering column member relative to the vehicle frame. The arm is deformable upon the application of a load to the steering column above a predetermined load to absorb at least a portion of the load applied to the steering column. If an occupant of the vehicle engages the steering wheel during an accident, the arm deforms to absorb the energy generated by the impact of the occupant on the steering wheel during a collision.

BRIEF DESCRIPTION OF THE DRAWINGS

The foregoing and other features of the present invention will become more apparent to one skilled in the art upon reading the following description of the present invention with reference to the accompanying drawings, wherein.

DESCRIPTION OF A PREFERRED EMBODIMENT

Figure 1:
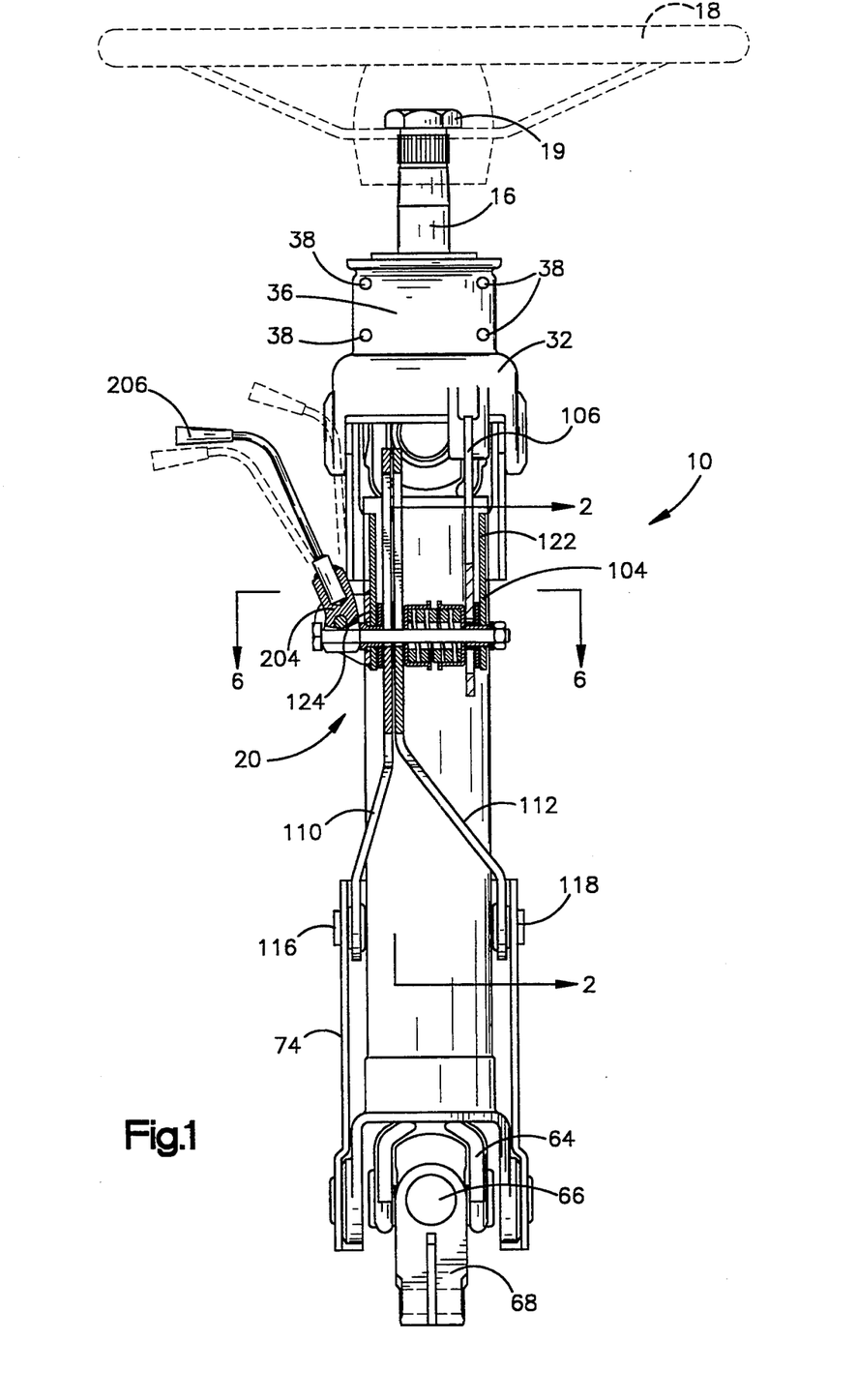
FIG. 1 is a sectional view of a steering column of the present invention.

The present invention comprises an axially and angularly adjustable vehicle steering column 10 (FIG. 1). The steering column 10 includes a pair of steering column members 12, 14 (FIG. 10) and an input shaft 16. A vehicle steering wheel 18 (FIG. 1) is attached to the input shaft 16 by a nut 19. The input shaft 16 and steering column members 12, 14 rotate upon rotation of the vehicle steering wheel 18. The steering column members 12, 14 telescope to effect axial adjustment of the steering wheel 18, see FIGS. 2 and 3. The input shaft 16 is pivotable relative to the steering column member 12 to effect angular adjustment of the steering wheel 18, see FIGS. 2 and 4. The steering column member 14 is pivotable relative to a vehicle frame to further effect angular adjustment of the steering wheel 18, see FIGS. 2 and 5.

A releasable locking mechanism 20 (FIG. 1) locks the steering column members 12, 14 in any one of an infinite number of telescoped positions within the limits of telescoping movement established by design. The locking mechanism 20, also within limits established by design, locks the steering column member 14 in any one of an infinite number of pivot positions relative to the vehicle frame. Similarly, the locking mechanism 20 also locks the input shaft 16 in any one of an infinite number of pivot positions relative to the steering column member 12.

Figure 10:
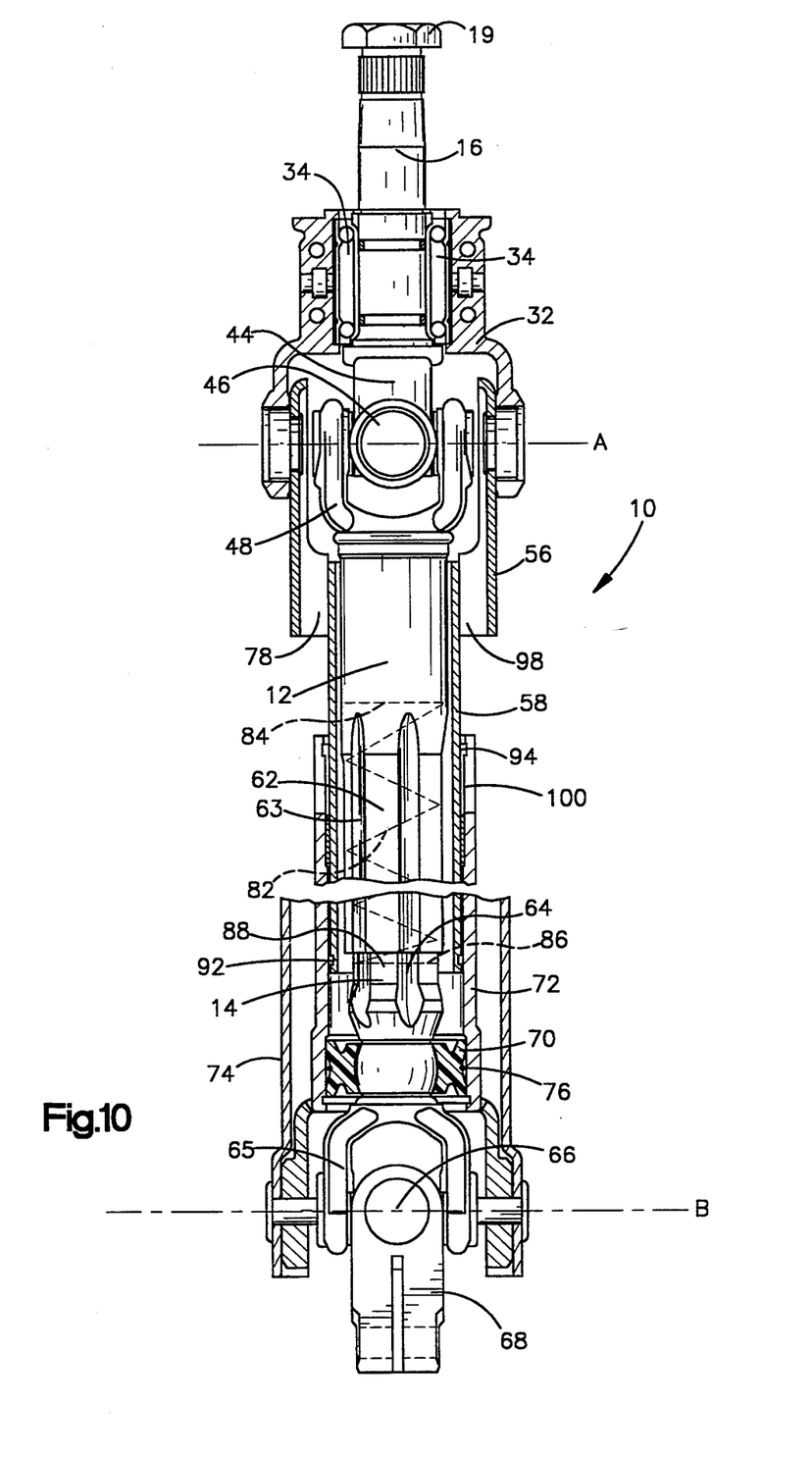
FIG. 10 is a sectional view taken along the lines 10—10 of FIG. 6.

The input shaft 16 extends into an upper housing 32 (FIG. 10). Bearings 34 are located in the upper housing 32 and support the input shaft 16 for rotation relative to the upper housing 32. A cover 36 (FIGS. 1 and 2) is connected to the upper housing 32 by screws 38. The cover 36 is removable from the upper housing 32 so that the bearings 34 may be reached for repair and maintenance.

The input shaft 16 is connected to a yoke 44 (FIG. 10) of a universal or Cardan joint 46. Another yoke 48 of the universal joint 46 is connected to the steering column member 12. The input shaft 16 can pivot, relative to the steering column member 12, about a pivot axis A of the universal joint 46. From the above, it should be clear that upon rotation of the steering wheel 18, the input shaft 16 and the steering column member 12 rotate together.

The upper housing 32 is pivotally connected to a pivot carrier 56 which is connected to the steering column member 12 by a jacket tube 58. The upper housing 32 is pivotable about the generally horizontal pivot axis A relative to the pivot carrier 56 and the jacket tube 58. Therefore, the upper housing 32 and the input shaft 16 pivot relative to the pivot carrier 56 and the steering column member 12. A tilt spring 60 (FIG. 2) connected between the upper housing 32 and the pivot carrier 56 biases the upper housing 32 to pivot in a counterclockwise direction, as viewed in FIGS. 2 and 4, relative to the pivot carrier 56.

The steering column member 14 extends into a lower tubular shaft portion 62 of the steering column member 12 (FIG. 10). Tubular shaft portion 62 has internal splines 63 (FIG. 6) thereon which mesh with external splines 64 on the steering column member 14. The splines 63 of the steering column member 12 mesh with the splines 64 of the steering column member 14 to effect rotation of the steering column member 14 upon rotation of the steering column member 12.

The steering column member 14 is connected to a yoke 65 (FIG. 10) of a universal or Cardan joint 66. Another yoke 68 of the universal joint 66 is connected to an output shaft (not shown). The output shaft is attached to a steering gear (not shown) of the vehicle. The steering column member 14 can pivot, relative to the vehicle frame, about a generally horizontal pivot axis B of the universal joint 66.

The steering column member 14 is supported by a split bearing 70 for rotation relative to a lower housing 72 which is pivotally connected to a bracket 74 connectable with the vehicle frame. The lower housing 72 is pivotable about the pivot axis B relative to the bracket 74. Therefore, the lower housing 72 pivots along with the steering column member 14 relative to the bracket 74 and the vehicle frame. A spring (not shown) may be connected between the lower housing 72 and the bracket 74 to bias the lower housing 72 to pivot in a counterclockwise direction, as viewed in FIGS. 2 and 5, relative to the bracket 74.

An O-ring 76 (FIG. 10) extends around the bearing 70 to take up wear in the bearing 70. Upon rotation of the steering wheel 18, the input shaft 16 and the steering column members 12, 14 rotate and the rotational movement and torque applied by the vehicle operator are transmitted to the output shaft to effect vehicle steering.

The steering column members 12, 14 may be moved axially (telescoped) relative to each other. One end of a spring 82 (shown schematically in FIG. 10) is located within the tubular shaft portion 62 of the steering column member 12 and acts against an end surface 84 of the tubular shaft portion 62. The other end of the spring 82 acts on a surface 86 in a tubular shaft portion 88 of the steering column member 14. The spring 82 acts to bias the steering column member 12 in a vertical direction, as viewed in FIG. 10, relative to the steering column member 14 to a longest or fully extended position.

A bushing 92 (FIG. 2) is connected to a lower portion of the jacket tube 58. A bushing 94 is connected to an upper portion of the lower housing 72. The bushings 92 and 94 support the jacket tube 58 and the steering column member 12 for axial movement relative to the lower housing 72.

Figure 6:
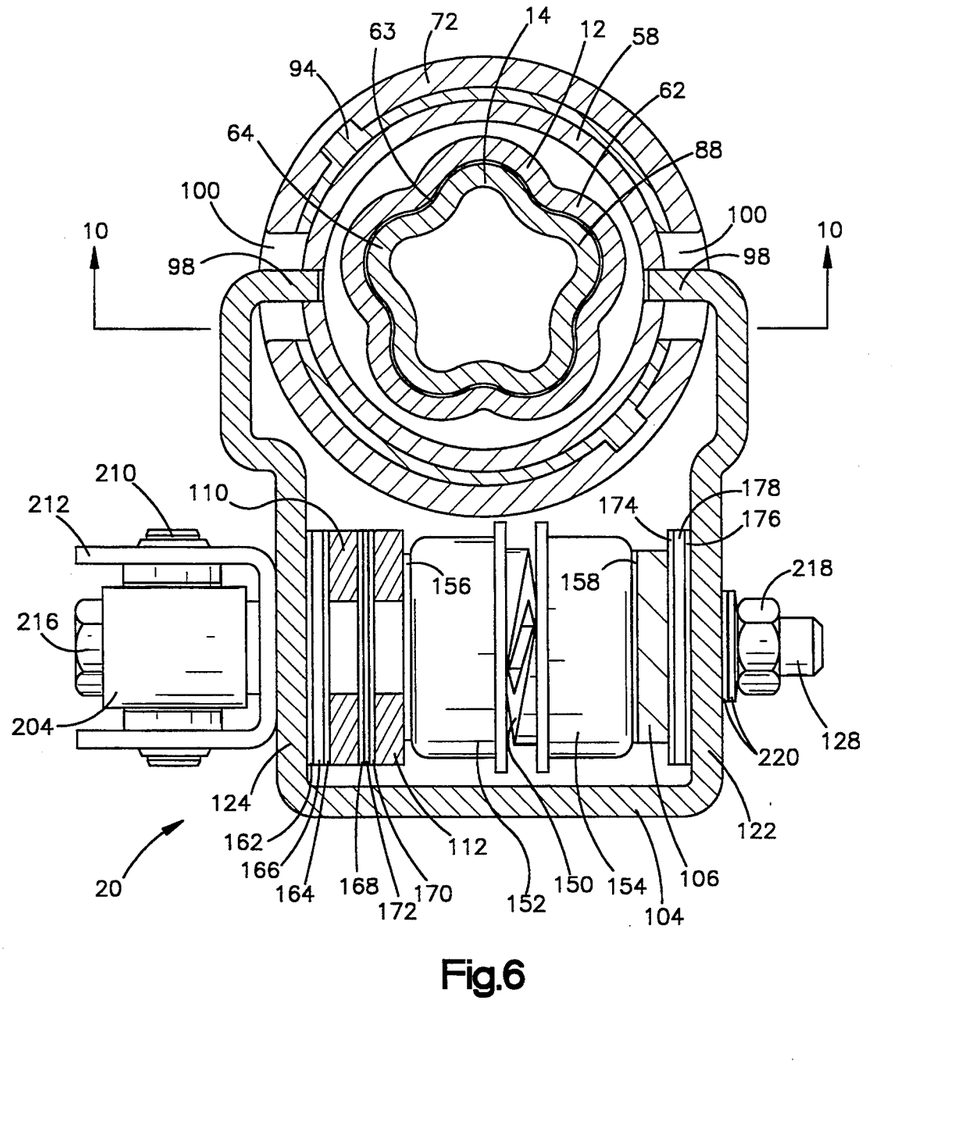
FIG. 6 is a sectional view taken along the lines 6—6 of FIG. 1 illustrating the locking means for locking the steering column in a desired adjusted position.

The pivot carrier 56 includes radially inwardly extending portions 98 (FIG. 10) which are connected to the upper portion of a jacket tube 58. The bushing 94 and the lower housing 72 include slots 100 (FIG. 6). The radially inwardly extending portions 98 of the pivot carrier 56 extend into the slots 100 when the steering column 10 is in a fully compressed position.

Figure 2:
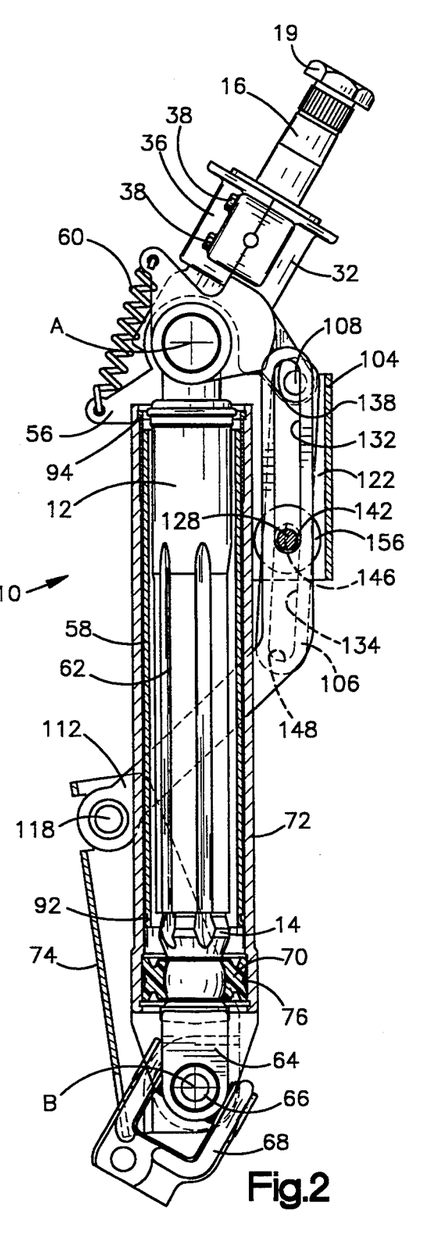
FIG. 2 is a sectional view taken along the lines 2—2 of FIG. 1, showing the steering column in a first position.
Figure 3:
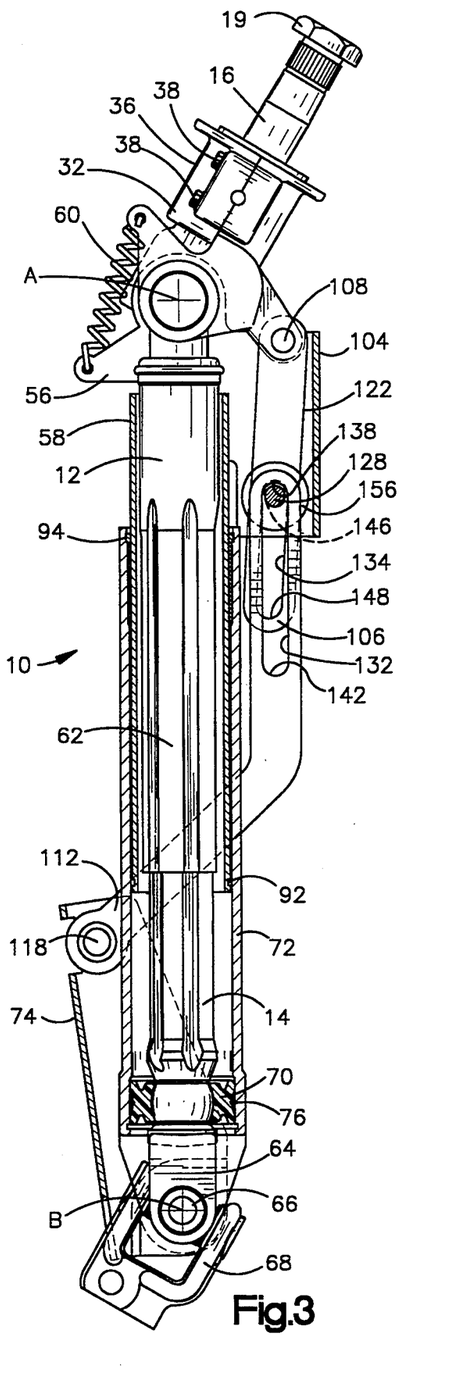
FIG. 3 is a sectional view, generally similar to FIG. 2, showing the steering column in a fully extended position.

Attached to and extending downwardly from the pivot carrier 56 is a bracket 104 (FIG. 1). The bracket 104 (FIG. 6) extends around a tilt lock bar 106 for controlling the pivot position of the input shaft 16. The tilt lock bar 106 is pivotally connected to the upper housing 32 by a pin 108 (FIGS. 2 and 3). The bracket 104 (FIG. 6) also extends around portions of arms 110 and 112 for controlling the pivot position of the steering column member 14 and the axial position of the steering column member 12. The arm 110 (FIG. 1) is pivotally connected to the bracket 74 by a pin 116. The arm 112 is pivotally connected to the bracket 74 by a pin 118. The bracket 104 includes a sidewall 122 (FIG. 6) located adjacent the tilt lock bar 102 and a sidewall 124 located adjacent the arm 110.

A shaft 128 (FIG. 7) extends through a slot 130 in the arm 110, a slot 132 in the arm 112, a slot 134 located in the tilt lock bar 106 and through the sidewalls 122 and 124 of the bracket 104. The slots 130 and 132 in the arms 110 and 112 have upper surfaces 136 and 138, respectively, for defining the fully extended position of the steering column 10, see FIG. 3, and an extremely clockwise pivot position of the steering column member 14, see FIG. 5. The slots 130 and 132 also have lower surfaces 140 and 142, respectively, for defining a fully compressed position for the steering column 10 and an extremely counterclockwise pivot position of the steering column member 14, see FIG. 2. The slot 134 in the tilt lock bar 106 has surfaces 146 and 148 for defining extreme pivot positions of the input shaft 16 relative to the steering column member 12, see FIGS. 2 and 4.

The shaft 128 extends through a spring 150 (FIG. 7) that applies a spring force to force spring cups 152 and 154 away from each other. A friction pad 156 attached to the spring cup 152 is located between the spring cup 152 and the arm 112. A friction pad 158 attached to the spring cup 154 is located between the spring cup 154 and the tilt lock bar 106. Friction pads 162 and 164 are spaced apart by a spacer 166 and are located between the arm 110 and the sidewall 124 of the bracket 104. Friction pads 168 and 170 are spaced apart by a spacer 172 and are located between the arms 110 and 112. Friction pads 174 and 176 are spaced apart by a spacer 178 and are located between the tilt lock bar 106 and the sidewall 122 of the bracket 104. The spring 150 applies forces that are sufficiently large as to clamp the arms 110 and 112 and the tilt lock bar 106 to the bracket 104 to normally prevent telescoping or tilting of the steering column 10. The friction pads aid in preventing relative movement between the tilt lock bar 106, the arms 110 and 112 and the bracket 104.

Figure 7:
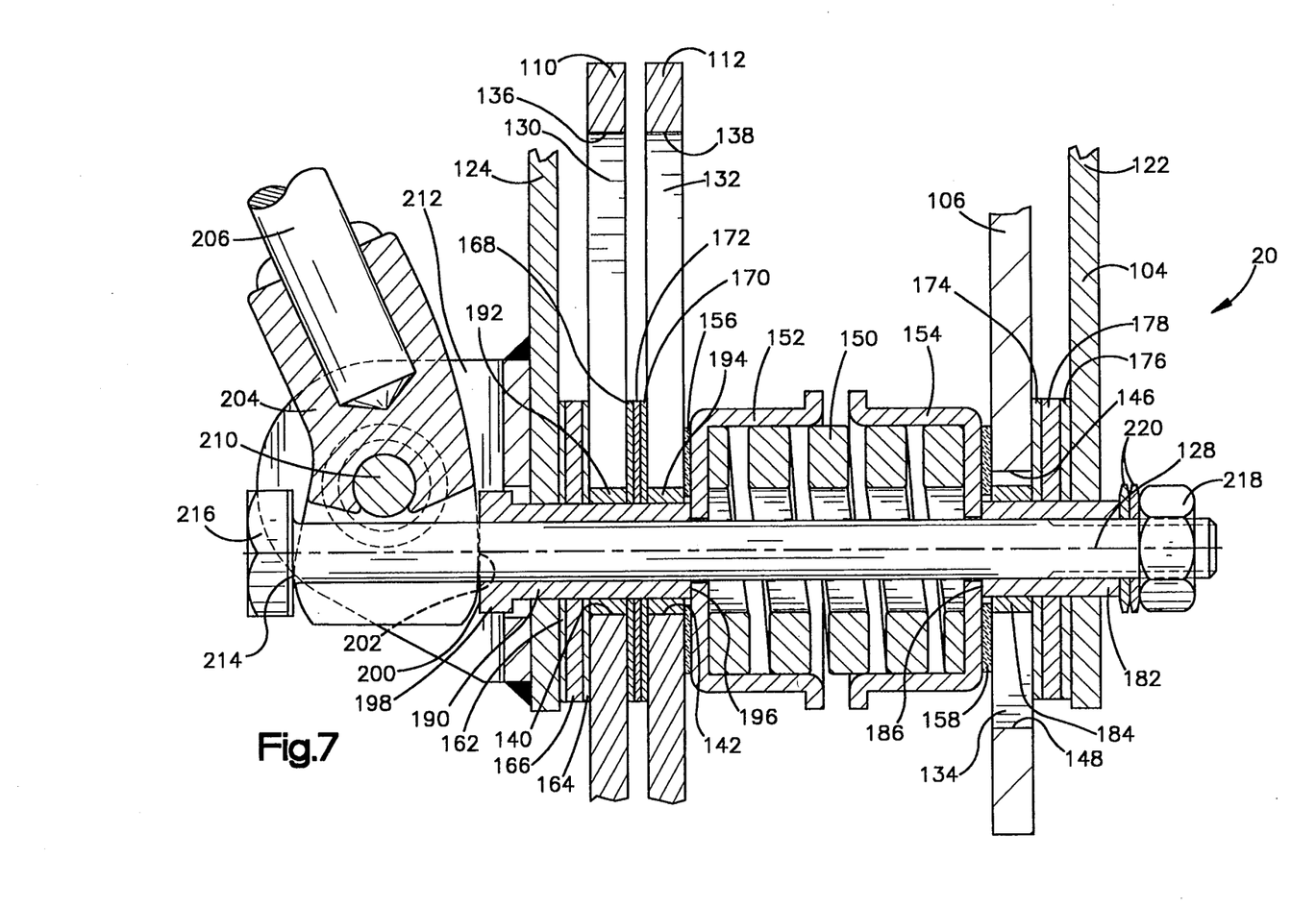
FIG. 7 is an enlarged sectional view of a locking means for locking the steering column in a desired adjusted position.

An actuation sleeve 182 for releasing the force applied by the spring 150 to clamp the tilt lock bar 106 to the sidewall 122 of the bracket 104 extends coaxially around a portion of the shaft 128. The actuation sleeve 182 extends through the sidewall 122 and a bushing 184 located in the slot 134 in the tilt lock bar 106. The bushing 184 allows movement of the tilt lock bar 106 relative to the shaft 128 during adjustment of the tilt position of the input shaft 16. An axial end portion 186 of the actuation sleeve 182 engages the spring cup 154. The actuation sleeve 182 is axially movable with the shaft 128 relative to the sidewall 122 and the bushing 184.

An actuation sleeve 190 for releasing the force applied by the spring 150 to clamp the arms 110 and 112 to the sidewall 124 of the bracket 104 extends coaxially with another portion of the shaft 128. The actuation sleeve 190 extends through a bushing 192 located in the slot 130, a bushing 194 located in the slot 132 and through the sidewall 124. The bushings 192 and 194 allow movement of the shaft 128 relative to the arms 110 and 112 during adjustment of the axial position of the steering column member 12 relative to the steering column member 14 and during adjustment of the pivot position of the steering column member 14 relative to the vehicle frame. An axial end portion 196 of the actuation sleeve 190 engages the spring cup 152. The actuation sleeve 190 includes a head 198. An annular surface 200 of the head 198 engages a cam surface 202 of a cam 204 connected to a handle 206 for unlocking the locking mechanism 20. The actuation sleeve 190 is axially movable relative to the shaft 128, the sidewall 124 and the bushings 192 and 194.

A pivot pin 210 extends through the cam 204 to pivotally connect the handle 206 and the cam 204 to flanges 212 connected to the sidewall 124 of the bracket 104. Accordingly, the handle 206 moves along with the bracket 104, the pivot carrier 56 and the steering column member 12 when the steering column member 12 is moved axially relative to the steering column member 14 and the lower housing 72. Therefore, the handle 206 remains at the same distance from the steering wheel 18.

The cam 204 includes a second cam surface 214 that engages a head 216 of the shaft 128. A nut 218 is threadably connected to the shaft 128 on the end opposite the head 216. A pair of Belleville washers 220 are located between the nut 218 and the actuation sleeve 182. The Belleville washers 220 take up wear in the locking mechanism 20 so that the locking mechanism provides reliable locking.

Figure 8:
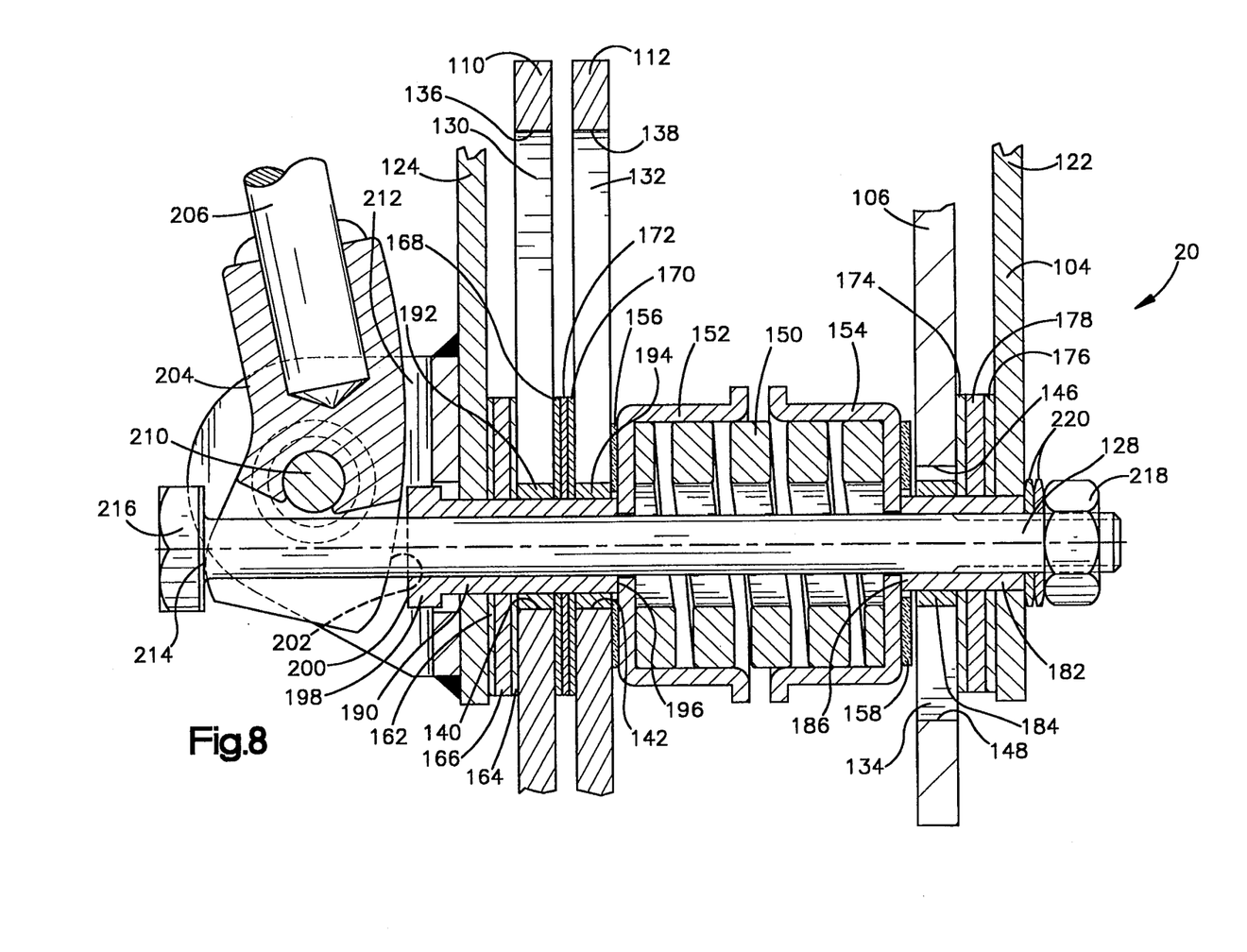
FIG. 8 is an enlarged sectional view of the locking means of FIG. 7 showing the locking means in a condition in which the tilt position of the input shaft is adjustable.

The spring 150 biases the locking mechanism 20 into a position in which the tilt lock bar 106 is clamped to the sidewall 122 to prevent the input shaft 16 from pivoting relative to the steering column member 12. The spring 150 also biases the handle 206 and the cam 204 into a first or locked position shown in FIG. 7. Upon pivoting the handle 206 and the cam 204 in a clockwise direction, as viewed in FIG. 7, from the first position into a second position, shown in FIG. 8, the cam surface 214 engages the head 216 of the shaft 128. The cam 204 causes the shaft 128 to move axially towards the left as seen in FIG. 8.

Upon axial movement of the shaft 128 to the left, the nut 218 and the Belleville washers 220 cause the actuation sleeve 182 to move along with the shaft 128. The axial end surface 186 of the actuation sleeve 182 engages the spring cup 154 and moves the spring cup 154 and the friction pad 158 to the left to compress the spring 150. The spring force clamping the tilt lock bar 106 to the sidewall 122 is released but the spring force clamping the sidewall 124 to the arms 110 and 112 is not released. The upper housing 32 and the input shaft 16 can pivot about the axis A relative to the pivot carrier 56 and the steering column member 12. When the handle 206 is released after pivotally positioning the input shaft 16, the spring 150 moves the tilt locking mechanism 20 into the first position, as seen in FIG. 7, to clamp the tilt lock bar 106 to the sidewall 122.

Figure 4:
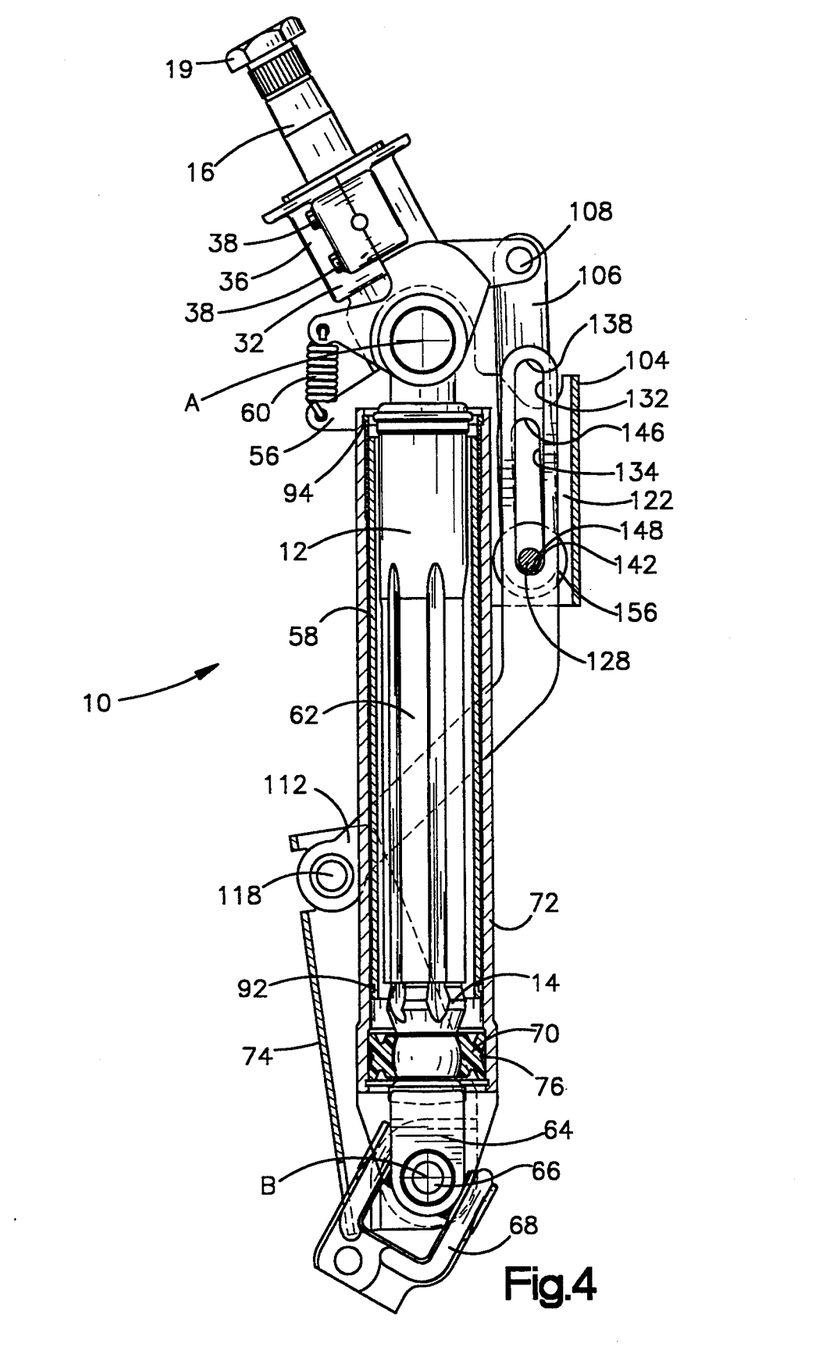
FIG. 4 is a sectional view, generally similar to FIG. 2, showing an input shaft in an extremely counterclockwise tilt position.

When the handle 206 is in its second position, the tilt lock bar 106 is movable relative to the bracket 104 to position the input shaft 16 in any one of an infinite number of pivot positions. The surface 146 of the slot 134 in the tilt lock bar 106 engages the bushing 184 located in the slot 134 when the input shaft 16 is in an extreme clockwise pivot position about the pivot axis A, as seen in FIG. 2. The surface 148 of the slot 134 engages the bushing 184 when the input shaft 16 is in an extreme counterclockwise position, as seen in FIG. 4. While adjusting the pivot position of the input shaft 16, the tilt lock bar 106 pivots relative to the pivot carrier 32 about the pin 108.

Figure 9:
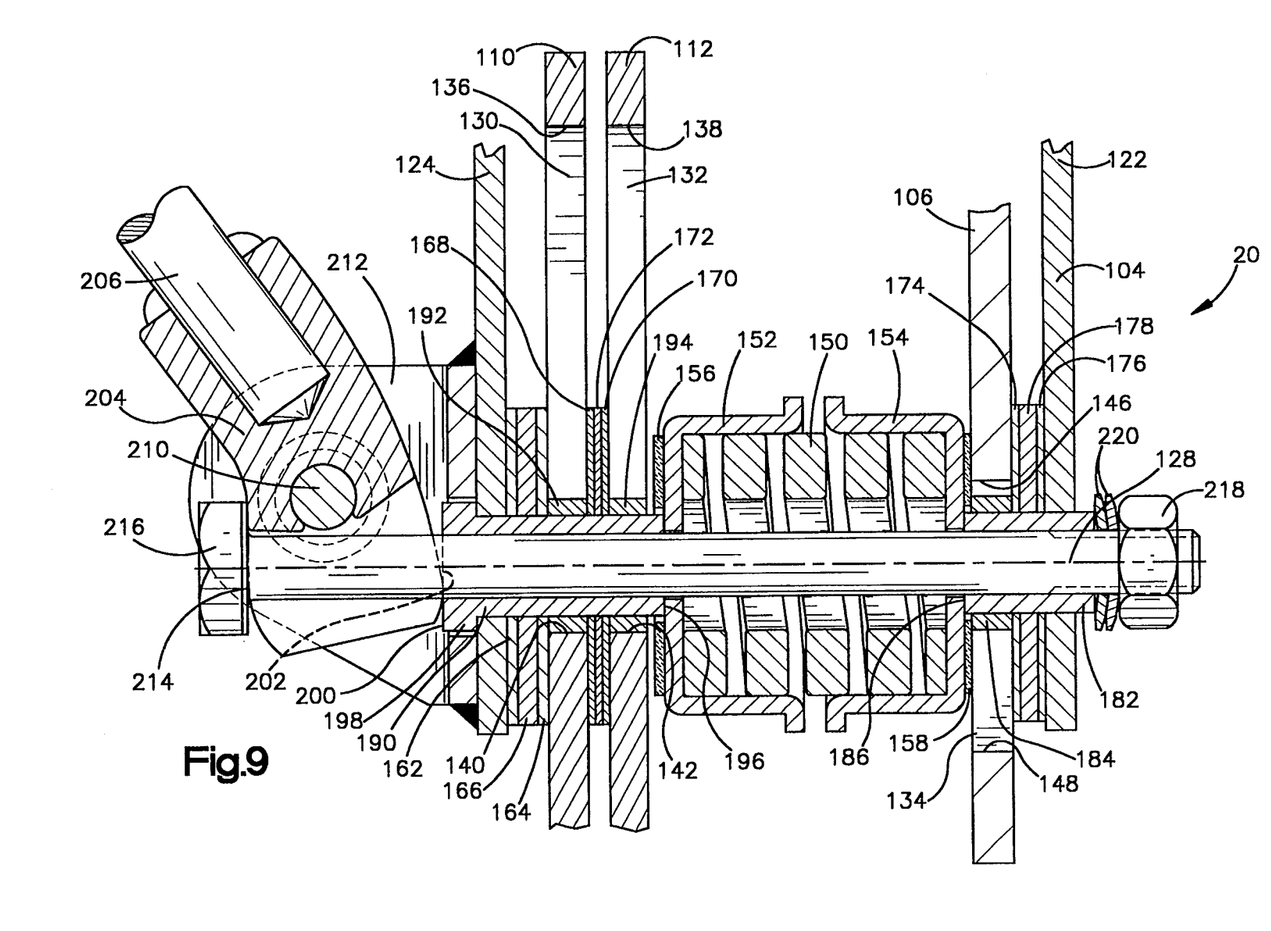
FIG. 9 is an enlarged sectional view of the locking means of FIG. 7 showing the locking means in a condition in which the axial position of the steering column is adjustable and the tilt position of the steering column member relative to the vehicle frame is adjustable.

Upon pivoting the handle 206 and the cam 204 in a counterclockwise direction, as viewed in FIG. 7, from the locked or first position to a third position, shown in FIG. 9, the cam surface 202 engages the surface 200 on the head 198 of the actuation sleeve 190. The cam 204 causes the actuation sleeve 190 to move towards the right as viewed in FIG. 9. The axial end surface 196 of the actuation sleeve 190 engages the spring cup 152 to move the spring cup 152 and the friction pad 156 towards the right to compress the spring 150. The spring force clamping the arms 110 and 112 to the sidewall 124 of the bracket 104 is released but the spring force clamping the tilt lock bar 106 to the sidewall 122 is not released. Therefore, the pivot carrier 56 can be moved relative to the lower housing 72 to move the steering column member 12 axially relative to the steering column member 14 and the lower housing 72 can be pivoted relative to the bracket 74 about the pivot axis B to pivot the steering column member 14 relative to the vehicle frame. When the handle 206 is released after axially positioning the steering column member 12 and pivotally positioning the steering column member 14, the spring 150 moves the handle 206 to its first position as seen in FIG. 7, to clamp the sidewall 124 to the arms 110 and 112.

When the handle 206 is in its third position, the bracket 104 and the shaft 128 are movable relative to the arms 110 and 112 to position the steering column member 12 axially relative to the steering column member 14 in any one of an infinite number of axial positions. Also, when the handle 206 is in its third position, the arms 110 and 112 are movable relative to the bracket 104 and the shaft 128 to position the steering column member 14 in any one of an infinite number of pivot positions.

Figure 5:
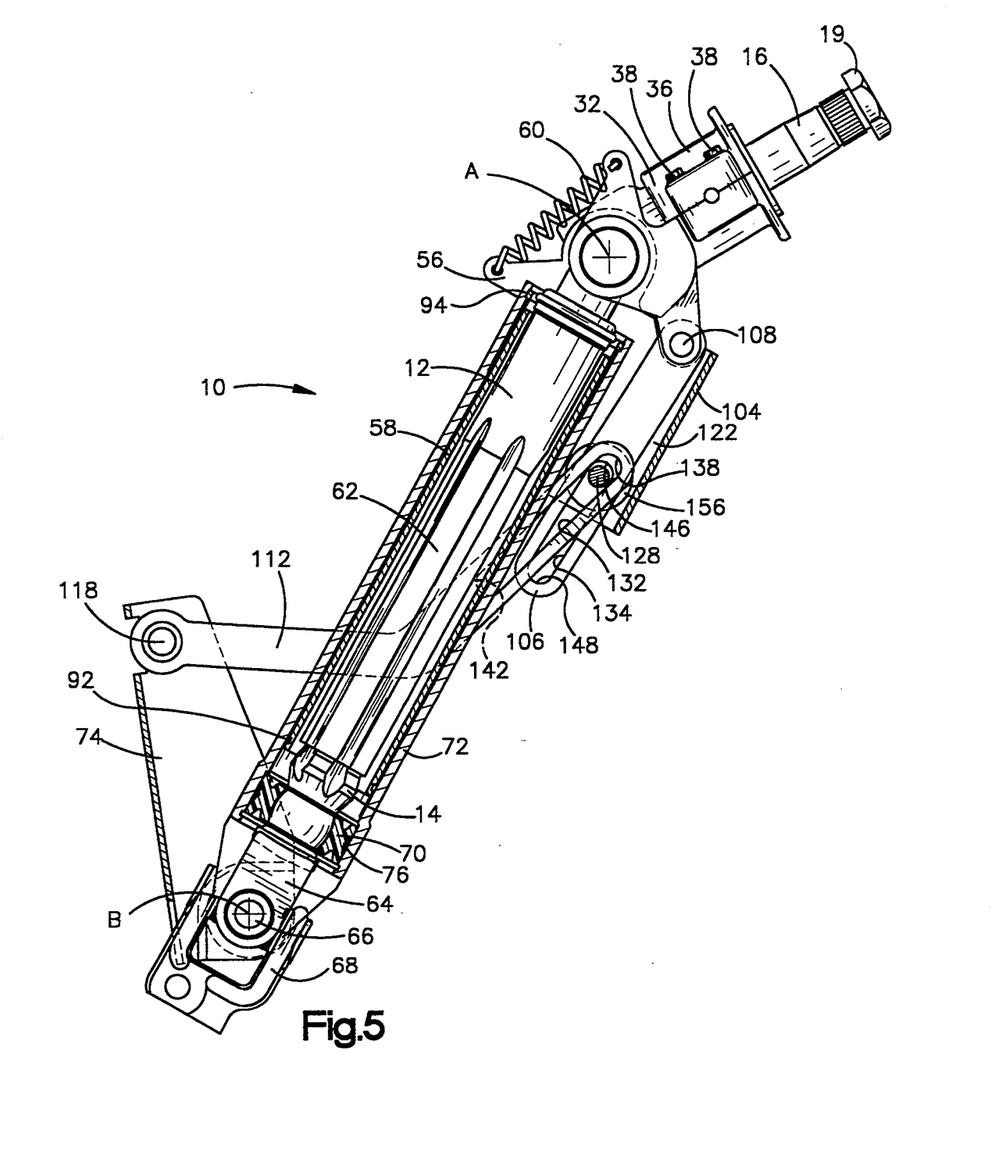
FIG. 5 is a sectional view, generally similar to FIG. 2, showing the steering column member in an extremely clockwise tilt position.

The bushings 192 and 194 in the slots 130 and 132 of the arms 110 and 112, respectively, engage the surfaces 140 and 142 when the steering column is in the fully compressed position or when the steering column member 14 is in an extreme counterclockwise position about the pivot axis B, as seen in FIG. 2. The bushings 192 and 194 engage the surfaces 136 and 138 when the steering column 10 is in the fully extended position, as seen in FIG. 3, or when the steering column member 14 is in an extreme clockwise pivot position about the pivot axis B, as seen in FIG. 5. While moving the bracket 104, the tilt lock bar 106 remains clamped to the sidewall 122 and moves along with the bracket. Thus, the pivot position of the input shaft 16 does not change while adjusting the axial position of the steering column member 12 or pivot position of the steering column member 14.

In the preferred embodiment of the steering column 10 the pivot position of the steering column member 14 and the axial position of the steering column member 12 are adjustable at the same time with the pivot position of the input shaft being adjustable separately. It is contemplated that the steering column 10 could be altered to have the pivot position of the input shaft 16 and the axial position of the steering column member 12 adjustable at the same time with the pivot position of the steering column member 14 separately adjustable or to have the pivot positions of the input shaft and the steering column member 14 adjustable at the same time with the axial position of the steering column member 12 separately adjustable. Also, it is contemplated that each of the three adjustments could be made individually while the other two adjustments are locked in position.

Although the steering column 10 has been shown with a handle 206 for releasing the locking mechanism 20, it is contemplated that any known means for releasing the locking mechanism 20 can be used. For example, electrically operated solenoids can be mounted on the steering column 10 to release the locking mechanism 20. Also, the locking mechanism 20 could be released by a pneumatic or hydraulic cylinder with a suitable control valve or by a push/pull cable. Any one of the means for releasing the locking mechanism 20 could be actuated by a floor mounted pedal or switch or by a device mounted on the steering wheel 18 or mounted on a dashboard of the vehicle.

The arms 110 and 112 are deformable upon the application of a load to the steering column 10 above a predetermined load to absorb at least a portion of the load applied to the steering column. When the steering column 10 is impacted by a vehicle occupant during a collision, energy is absorbed by the deformation of the arms 110 and 112 to lessen the severity of the impact on the vehicle occupant. The steering column 10 collapses and remains operable to maintain control over the vehicle after an initial collision. Also, the tilt lock bar 106 may be deformable.

From the above description of the invention, those skilled in the art will perceive improvements, changes and modifications. Such improvements, changes and modifications within the skill of the art are intended to be covered by the appended claims.

Having described the invention, the following is claimed:

1. A rotatable, torque transmitting drive assembly for an automotive vehicle steering column comprising:
   an input shaft;
   means connected to and rotatable with said input shaft for transferring rotational movement of said input shaft to an output shaft to effect movement of steerable vehicle wheels of a vehicle, said transfer means being pivotable relative to a vehicle frame into a plurality of pivot positions to position a steering wheel connectable with said input shaft relative to an occupant of the vehicle, said input shaft being pivotable relative to said transfer means into a plurality of pivot positions, said input shaft having a plurality of pivot positions for each one of said plurality of pivot positions of said transfer means to further position the steering wheel relative to an occupant of the vehicle; and
   a locking mechanism for locking said transfer means in any one of the plurality of pivot positions relative to the vehicle frame and for locking said input shaft in any one of the plurality of pivot positions relative to said transfer means.

2. A rotatable, torque transmitting drive assembly for an automotive vehicle steering column comprising:
   an input shaft;
   means connected to and rotatable with said input shaft for transferring rotational movement of said input shaft to an output shaft to effect movement of steerable wheels of a vehicle, said input shaft being pivotable relative to said transfer means to position a steering wheel connectable with said input shaft relative to an occupant of the vehicle, said transfer means being pivotable relative to a vehicle frame to further position the steering wheel relative to an occupant of the vehicle;
   said transfer means comprising first and second steering column members axially movable relative to each other, said input shaft being pivotable relative to said first steering column member, said second steering column member being pivotable relative to the vehicle frame; and
   a locking mechanism for locking said transfer means in any one of a plurality of pivot positions relative to the vehicle frame and for locking said input shaft in any one of a plurality of pivot positions relative to said transfer means.

3. A steering column as set forth in claim 2 wherein said locking mechanism locks said first steering column member in an axial position relative to said second steering column member.

4. A steering column as set forth in claim 3 wherein said locking mechanism includes a locking member, said locking member having a first position preventing said second steering column member from pivoting relative to the vehicle frame, preventing said input shaft from pivoting relative to said first steering column member, and preventing said first steering column member from axially moving relative to said second steering column member, a second position allowing said input shaft to pivot relative to said first steering column member, preventing said second steering column member from pivoting relative to the vehicle frame and preventing said first steering column member from axially moving relative to said second steering column member, and a third position in which said second steering column member is pivotable relative to the vehicle frame, said first steering column member is axially movable relative to said second steering column member, and said input shaft is prevented from pivoting relative to said first steering column member.

5. A steering column as set forth in claim 3 wherein said locking mechanism includes means for locking said first steering column member in any one of an infinite number of axial positions relative to the second steering column member, means for locking said second steering column member in any one of an infinite number of pivot positions relative to the vehicle frame, and means for locking said input shaft in any one of an infinite number of pivot positions relative to said first steering column member.

6. A steering column as set forth in claim 5 further comprising:
an upper housing rotatably supporting said input shaft;
a tilt lock bar pivotally connected to said upper housing;
a pivot carrier connected to said first steering column member and supporting said upper housing for pivotal movement relative to said pivot carrier;
a lower housing rotatably supporting said second steering column member; and
an arm pivotable relative to the vehicle frame to control pivotal movement of said second steering column member relative to the vehicle frame;
said locking mechanism including means for applying a friction force between said arm and said pivot carrier connected to said first steering column member preventing said second steering column member from pivoting relative to the vehicle frame and preventing relative axial movement between said first and second steering column members and means for applying a friction force between said tilt lock bar and said pivot carrier preventing said input shaft from pivoting relative to said first steering column member.

7. A rotatable, torque transmitting drive assembly for an automotive vehicle steering column comprising:
an input shaft;
means connected to and rotatable with said input shaft for transferring rotational movement of said input shaft to an output shaft to effect movement of steerable wheels of a vehicle, said input shaft being pivotable relative to said transfer means to position a steering wheel connectable with said input shaft relative to an occupant of the vehicle, said transfer means being pivotable relative to a vehicle frame to further position the steering wheel relative to an occupant of the vehicle;
a locking mechanism for locking said transfer means in any one of a plurality of pivot positions relative to the vehicle frame and for locking said input shaft in any one of a plurality of pivot positions relative to said transfer means;
said locking mechanism including a locking member, said locking member having a first position preventing said transfer means from pivoting relative to the vehicle frame and preventing said input shaft from pivoting relative to said transfer means, a second position allowing said input shaft to pivot relative to said transfer means and preventing said transfer means from pivoting relative to the vehicle frame, and a third position allowing said transfer means to pivot relative to the vehicle frame and preventing said input shaft from pivoting relative to said transfer means.

8. A steering column as set forth in claim 1 further including an arm extending between the vehicle frame and said transfer means for controlling the pivotal position of said transfer means relative to the vehicle frame, said arm being deformable upon the application of a load to said steering column above a predetermined load to absorb at least a portion of the load applied to said steering column.

9. A steering column comprising:
first and second coaxial steering column members, said first steering column member being axially movable relative to said second steering column member, said second steering column member being pivotable relative to a vehicle frame about a first axis extending transverse to the direction of relative axial movement between said first and second steering column members;
an input shaft connectable with a steering wheel and supported on said first steering column member for pivotal movement relative to said first steering column member about a second axis extending transverse to the direction of relative axial movement between said first and second steering column members;
a first tilt locking means for locking said second steering column member in a pivot position relative to the vehicle frame;
a second tilt locking means for locking said input shaft in a pivot position relative to said first steering column member;
a telescope locking means for locking said first steering column member in an axial position relative to said second steering column member; and
a locking member movable to unlock said first and second tilt locking means and said telescope locking means, said locking member having a first position in which said first and second tilt locking means and said telescope locking means are locked.

10. A steering column as set forth in claim 9 wherein said locking member has a second position in which said first tilt locking means and said telescope locking means are locked and said second tilt locking means is unlocked and a third position in which said first tilt locking means and said telescope locking means are unlocked and said second tilt locking means is locked.

11. A steering column as set forth in claim 10 further including means for biasing said locking member into its first position.

12. A steering column as set forth in claim 9 further including a pivot carrier connected to said first steering column member and an arm extending between said pivot carrier and the vehicle frame to control the pivot position of said second steering column member, said arm being deformable upon the application of load to said steering column above a predetermined load to absorb at least a portion of the load applied to said steering column.

* * * * *